United States Patent
Nishikawa et al.

(10) Patent No.: US 6,587,289 B2
(45) Date of Patent: Jul. 1, 2003

(54) METHOD OF MAGNETICALLY TRANSFERRING INFORMATION SIGNAL FROM MASTER MEDIUM TO SLAVE MEDIUM

(75) Inventors: Masakazu Nishikawa, Kanagawa-ken (JP); Kazuyuki Usuki, Kanagawa-ken (JP); Masashi Aoki, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/928,482

(22) Filed: Aug. 14, 2001

(65) Prior Publication Data
US 2002/0075111 A1 Jun. 20, 2002

(30) Foreign Application Priority Data

Aug. 14, 2000 (JP) ........................................ 2000-245760

(51) Int. Cl.$^7$ ................................................. G11B 5/86
(52) U.S. Cl. .............................. 360/15; 360/16; 360/17; 335/284
(58) Field of Search .............................. 360/15, 16, 17, 360/91; 335/284

(56) References Cited

U.S. PATENT DOCUMENTS

| 3,767,866 A | * | 10/1973 | Higashida et al. ............. 360/17 |
| 3,824,617 A | * | 7/1974 | Kobayashi et al. ............. 360/16 |
| 5,916,655 A | * | 6/1999 | Kwon .......................... 216/52 |
| 6,204,331 B1 | * | 3/2001 | Sullivan et al. ............. 473/372 |

FOREIGN PATENT DOCUMENTS

| EP | 0915456 A1 | 5/1999 | ............ G11B/5/86 |
| JP | 63-183623 | 7/1988 | ............ G11B/5/86 |
| JP | 10-40544 | 2/1998 | ............ G11B/5/86 |
| JP | 10-269566 | 10/1998 | ............ G11B/5/84 |

* cited by examiner

*Primary Examiner*—Ramon M. Barrera
(74) *Attorney, Agent, or Firm*—Sughrue Mion, PLLC

(57) ABSTRACT

A magnetic transfer method for magnetically transferring information signals such as servo signals from a master medium to a slave medium, capable of reducing a range of signal missing due to insufficient contact of the two mediums originating from an adhering substance, thus enhancing signal quality. When the master medium bearing an information signal and the slave medium are brought into close contact with each other, a transferring magnetic field is applied thereto, thus magnetically transferring the information signal from the master medium to the slave medium. An elastic member made of a material having an elastic property so as to deform in accordance with a surface shape of the slave medium during contact pressure application and to restore to an original surface shape thereof during release of the slave medium from the master medium can be interposed between a back of the slave medium and a pressing surface of a pressing support member.

1 Claim, 2 Drawing Sheets

F I G. 4
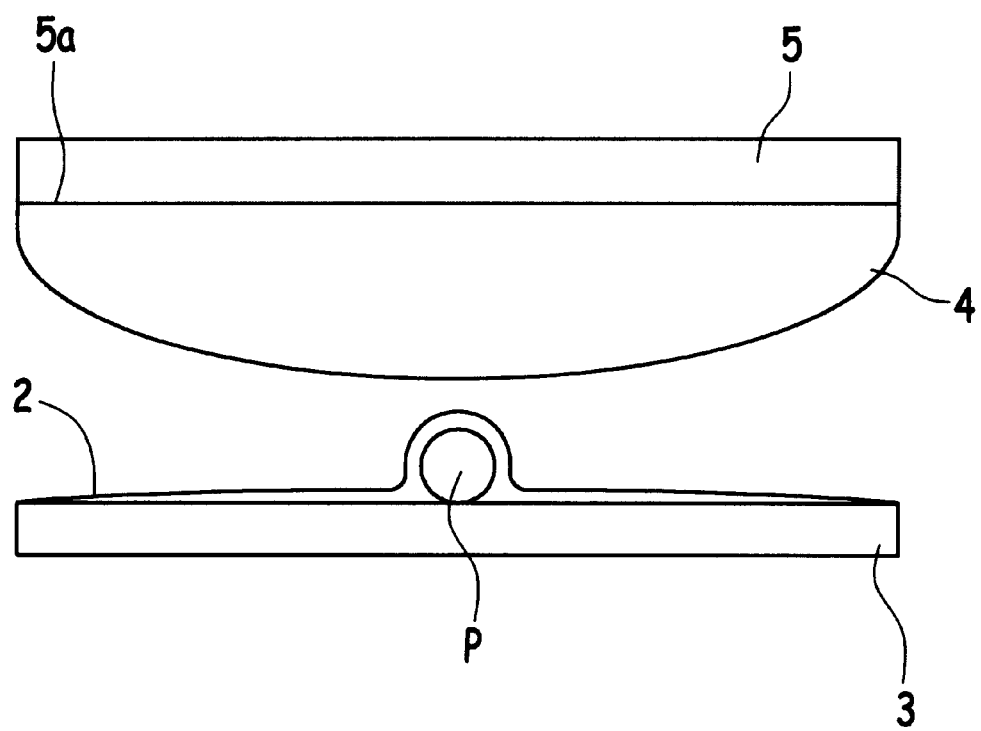

METHOD OF MAGNETICALLY TRANSFERRING INFORMATION SIGNAL FROM MASTER MEDIUM TO SLAVE MEDIUM

BACKGROUND OF THE INVENTION

1. Field of the Invention

The present invention relates to a method of magnetically transferring magnetic information signals held in a master medium to a slave medium.

2. Description of the Prior Art

The magnetic transfer method is one for magnetically transferring magnetic patterns corresponding to magnetic information (for example, servo signals) held in a master medium to a slave medium by applying transferring magnetic field in a state where the master medium and the slave medium are in close contact with each other. This magnetic transfer method is disclosed, for example, in Japanese Unexamined Patent Publication Nos. 63(1988)-183623, 10(1998)-40544, 10(1998)-269566 and the like.

SUMMARY OF THE INVENTION

However, if an adhering substance exists between the master medium and the slave medium in magnetically transferring the magnetic pattern from the master medium to the slave medium (during magnetic transfer), a space is created between the master medium and the slave medium in the vicinity of the adhering substance to cause an insufficient contact, and hence an area is created, where no magnetic transfer is executed. If such an area is created, where no magnetic transfer is executed, the magnetic information is not transferred at this area, and signal missing occurs in the magnetic information transferred to the slave medium. Thus, the signal quality is lowered. When the recorded signals are servo signals, a satisfactory tracking function cannot be obtained, and reliability of reproducing the information signals is lowered.

Specifically, as schematically shown in FIG. 3, during magnetic transfer, an information bearing plane of a master medium 3 and a magnetic recording surface of a slave medium 2 are made to contact each other, and by pressing a back of the slave medium 2 against the information bearing plane of the master medium 3 with a pressing support member 5, the information bearing plane and the magnetic recording surface are made to be in close contact with each other. In this state, a transferring magnetic field is applied to the master medium 3 and the slave medium 2 by magnetic field generating means (not shown), and information such as servo signals is magnetically transferred and recorded onto the slave medium 2 from the master medium 3. However, if an adhering substance P (particle) is adhered onto the surface of either the master medium 3 or the slave medium 2, when a pressure for allowing the master medium 3 and the slave medium 2 to be brought into close contact with each other is applied thereto, a gap is created in the vicinity of the adhering substance P between the master medium 3 and the slave medium 2 because a pressing surface 5a of the pressing support member 5 is a flat rigid body, thus causing an insufficient contact. Due to the insufficient contact, in a wide signal missing range D having a roughly circular shape around the adhering substance P as a center, the magnetic pattern corresponding to a micro uneven pattern made of a magnetic substance of the surface of the master medium 3 cannot be transferred to the slave medium 2, leading to the occurrence of a degradation in transfer and signal missing.

Particularly, the signal missing range D thus occurred has an area such that a ratio of a diameter of the range D to a diameter d of the adhering substance P is large. It has been found that the adhering substance P is mainly made of dust or fiber waste generated in the manufacturing process of the slave medium 2, which is adhered onto the surface of the slave medium 2.

The present invention was made with the above-described problems in mind. The object of the present invention is to provide a method of magnetically transferring information signals from a master medium to a slave medium, which is capable of improving signal quality by reducing a signal missing range during the magnetic transfer.

The magnetic transfer method of the present invention, which has solved the foregoing problems, is a magnetic transfer method, comprising the steps of: preparing a master medium bearing information signals; preparing a slave medium; allowing the master medium and the slave medium to be brought into close contact with each other; and applying a transferring magnetic field to the master medium and the slave medium, thus magnetically transferring the information signals from the master medium to the slave medium. The magnetic transfer method of the present invention is characterized in that a material having an elastic property is mounted on one surface of the slave medium opposite with the other surface thereof contacting the master medium, and a pressing support member is mounted on the material with a pressing surface thereof contacting the material, the elastic property being of such a nature to deform in accordance with a surface shape of the slave medium when a contact pressure is applied to the material, and to restore an original surface shape thereof when the slave medium is released from the master medium.

It is preferable that a Young's modulus of the material having the elastic property be set in a range from $5.0 \times 10^{-5}$ Pa to less than $3.0 \times 10^{-3}$ Pa. It is preferred that the applied pressure during magnetic transfer be set in a range from $9.8 \times 10^{-5}$ Pa to less than $4.9 \times 10^{-3}$ Pa. Moreover, it is desirable that a thickness of the material having the elastic property be set in a range from 0.1 mm to less than 6 mm.

In the foregoing magnetic transfer method, preferably, the slave medium is first subjected to DC magnetization in a tracking direction, and the slave medium is allowed to be in close contact with the master medium for use in magnetic transfer, in which a magnetic layer is formed in a micro uneven pattern corresponding to information signals magnetically transferred. A transferring magnetic field should be applied to the master medium and the slave medium in a direction approximately reverse to an initial DC magnetization direction for the slave medium. A servo signal is preferred as the foregoing information signal.

According to the present invention as described above, when the master medium bearing the information signals to be transferred and the slave medium are allowed to be brought into close contact with each other, and the transferring magnetic field is applied to the two mediums, thus transferring the information signal from the master medium to the slave medium, the material is allowed to be interposed between the back of the slave medium and the pressing surface of the pressing support member, which presses the slave medium against the master medium. In this case, the material has an elastic property to deform its surface shape in accordance with the surface shape of the slave medium when a contact pressure is applied to the material and to restore its original surface shape when the slave medium is released from the master medium. Thus, when a pressure is applied to the material, the material having the elastic property deforms to the shape of the adhering substance. Accordingly, it is possible to narrow a range where a gap is created between the master medium and the slave medium on the periphery of the adhering substance. Hence, an occurrence range of the signal missing can be narrowed, thus enabling the quality of the transfer signal to be enhanced.

The Young's modulus of the material having the elastic property is set in a range from $5.0 \times 10^{-5}$ Pa to less than $3.0 \times 10^{10}$ Pa. When the Young's modulus is less than $5.0 \times 10^{-5}$ Pa, the material having the elastic property deforms in accordance with the shape of the adhering substance. However, after releasing the applied pressure, the material having the elastic property does not restore its surface shape to the original shape. Therefore, the material cannot achieve a complete close contact of the master medium and the slave medium at the next time and subsequently. Moreover, when the Young's modulus is $3.0 \times 10^{10}$ Pa or more, since the material having the elastic property does not adaptively deform to the shape of the adhering substance, a wide space is created on the periphery thereof. Furthermore, also in terms of the surface property of the slave medium and the durability of the master medium, it is preferable to set the Young's modulus in the above-described range.

The applied pressure during the magnetic transfer is set in a range from $9.8 \times 10^{31\ 5}$ Pa to less than $4.9 \times 10^{-3}$ Pa, and the thickness of the material having the elastic property is set in a range from 0.1 mm to less than 6 mm. Thus, a better magnetic transfer characteristic can be secured.

BRIEF DESCRIPTION OF THE DRAWINGS

FIG. 4 is a sectional view showing an adhering substance and a periphery thereof in a magnetic transfer method according to another embodiment of the present invention.

DETAILED DESCRIPTION OF THE PREFERRED EMBODIMENTS

Here in below, description will be given in detail for an embodiment of the present invention, with reference to the accompanying drawings.

Figure 1:
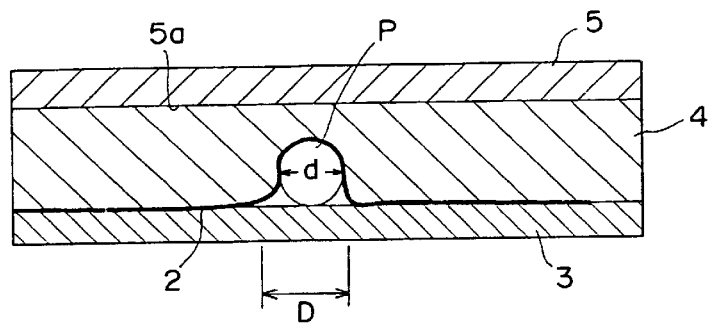
FIG. 1 is a sectional view showing an adhering substance and a periphery thereof in a magnetic transfer method according to an embodiment of the present invention.
Figure 2A:
FIGS. 2A, 2B and 2C are sectional views showing principal steps of the magnetic transfer method according to the embodiment of the present invention.
Figure 2B:
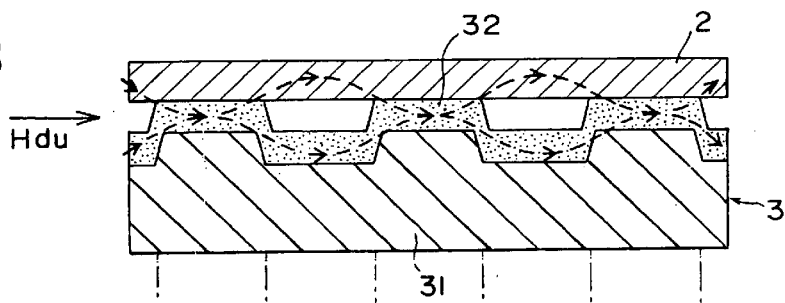
Figure 2C:
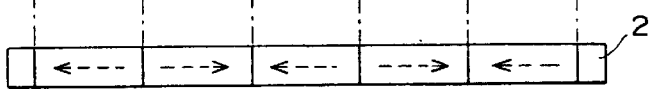
Figure 3:
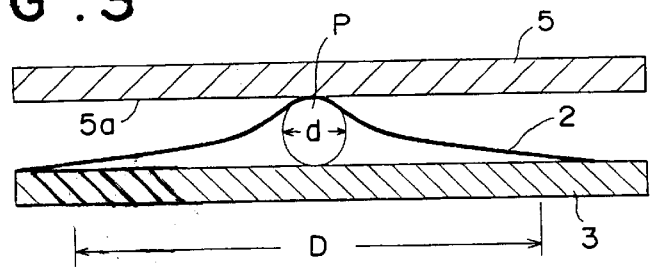
FIG. 3 is a sectional view showing the adhering substance and a periphery thereof in a magnetic transfer method according to an example for comparison.

FIG. 1 is a sectional view showing a transfer state in a magnetic transfer method according to one embodiment of the present invention. FIGS. 2A, 2B and 2C are sectional views showing a principal mode of the magnetic transfer method according to the present invention. FIG. 2A shows a step of allowing a slave medium to undergo initial DC magnetization by applying magnetic field in one direction. FIG. 2B shows a step of bringing the master medium and the slave medium into close contact with each other and applying the magnetic field to them in a direction reverse to that of FIG. 2A. FIG. 2C shows a state of the slave medium after the magnetic transfer. Note that each of the figures is a schematic view, and that thickness of each medium or the like shown therein is different from an actual dimension.

In FIG. 1, during the magnetic transfer, a magnetic recording surface of a slave medium 2 is allowed to contact an information bearing plane of a master medium 3. A contact pressure is applied from a pressing surface 5a of a pressing support member 5 to the slave medium 2 and the master medium 3 with an elastic member 4 made of a material having an elastic property interposed between a back of the slave medium 2 and the pressing surface 5a. In this close-contact state between the master medium 3 and the slave medium 2, a transferring magnetic field is applied to them by magnetic field generating means (not shown). Thus, information such as servo signals of the master medium 3 is magnetically transferred to the slave medium 2 to be recorded therein.

With regard to the material of the elastic member 4, a Young's modulus is set in a range from $5.0 \times 10^{31\ 5}$ Pa to less than $3.0 \times 10^{10}$ Pa. Also, the material has a property such that it deforms in accordance with a surface shape of the slave medium 2 when a contact pressure is applied to the two mediums and restores to an original surface shape thereof when the slave medium 2 is released from the slave medium 3.

Moreover, the applied pressure during the magnetic transfer is set in a range from $9.8 \times 10^{31\ 5}$ Pa (5.0 kgf/cm$^2$) to less than $4.9 \times 10^3$ Pa (0.1 kgf/cm$^2$). In order to secure the close contact of the master medium 3 and the slave medium 2, it is effective to increase the pressure applied to them. When the applied pressure is less than $9.8 \times 10^{\times 5}$ Pa, sufficiently close contact of the master medium 3 and the slave medium 2 cannot be secured, and thus signal missing frequently occurs. As the pressure is increased, signal missing is significantly reduced. However, when a pressure of $4.9 \times 10^{-3}$ Pa or more is applied, the master medium 3 itself is broken, or the slave medium 2 is plastically deformed by the adhering substance existing between the master medium 3 and the slave medium 2.

The thickness of the elastic member 4 is set in a range from 0.1 mm to less than 6 mm. When the thickness is less than 0.1 mm, such deformation by the adhering substance cannot be completely absorbed, thus causing signal missing. On the other hand, when the thickness is more than 6 mm, the elastic member 4 wholly deforms during the pressure application, and due to such deformation, unpreferable deformation of the slave medium 2, such as positional slippage thereof from the master medium 3, may occur.

In the case where the adhering substance P (particle) is adhered onto the surface of the master medium 3 or of the slave medium 2, when the contact pressure is applied to the master medium 3 and the slave medium 2, as shown in FIG. 1, the surface of the elastic member 4, which presses the slave medium 2 against the master medium 3, deforms to the shape of the adhering substance P, presses the slave medium 2, and allows the slave medium 2 to deform along the shape of the adhering substance P. Thus, the formation range of the gap between the master medium 3 and the slave medium 2 on the periphery of the adhering substance P can be narrowed. Hence, a signal missing range D around the adhering substance P as a center, which is caused by the insufficient contact of the master medium 3 and the slave medium 2 on the periphery of the adhering substance P, can also be narrowed. Therefore, the quality of the transfer signal can be enhanced. In this case, an expansion ratio of the foregoing signal missing range D to a diameter d of the adhering substance P is lowered.

As a specific material of the above-described elastic member 4, common rubber such as silicon rubber, polyurethane rubber, fluorine rubber, butadiene rubber, Teflon rubber and viton rubber can be used.

Rubber having rubber hardness ranging from 10 to 100 can be used, and preferably, the rubber hardness ranges from 40 to 80 . The Young's modulus preferably ranges from $5.0 \times 10^{-5}$ Pa to $3.0 \times 10^{10}$ Pa, more preferably ranges from $8.0 \times 10^{-5}$ Pa to $4.1 \times 10^{4}$ Pa, and still more preferably ranges from $1.2 \times 10^{-4}$ Pa to $5.1 \times 10^{2}$ Pa.

The surface shape of the elastic member 4, which contacts the slave medium 2, is formed in a plane shape parallel to the master medium 3 or in a convex shape toward the slave medium 2. See FIG. 4. The convex shape is preferably a circular arc, but may be so-called conical. In the case of the circular arc or conical shape, it is preferable that a ratio of a difference between the center of the convex and an edge thereof (height of the convex) be set to 5% or less of the diameter of the elastic member 4.

Moreover, the pressure by the pressure applying means may be applied onto the entire back of the elastic member 4, which is opposite to the slave medium 2. Alternatively, a sufficient gap capable of absorbing the deformation of the elastic member 4 may be provided on a part of the back of the elastic member 4. For example, the pressing surface 5a of the pressing support member 5 provided on the back of the elastic member 4 is provided so as to press the elastic member 4, excluding the vicinity of the center thereof, against the slave medium 2. Thus, the deformation (elevation) in the vicinity of the center of the elastic member 4 occurs in the portion where the pressing surface 5a does not make contact. Therefore, a large stress can be prevented from concentrating on the center of the slave medium 2.

A summary of the magnetic transfer method is as follows. First, as shown in FIG. 2A, an initial magnetic field Hin is applied to the slave medium 2 in the same direction as a tracking direction, and the slave medium 2 is previously subjected to DC magnetization (DC demagnetization). Thereafter, as shown in FIG. 2B, a magnetic transfer surface of the slave medium 2 is brought into close contact with an information bearing plane obtained by covering a micro uneven pattern of a substrate 31 of the master medium 3 with a magnetic layer 32. A transferring magnetic field Hdu is applied to the master medium 3 and the slave medium 2 along a tracking direction of the slave medium 2 in a direction reverse to the initial magnetic field Hin. Thus, the magnetic transfer is performed. As a result, as shown in FIG. 2C, information of the master medium 3 is magnetically transferred and recorded to a magnetic transfer surface (track) of the slave medium 2. The information corresponds to the pattern formed by recesses and protrusions of the magnetic layer 32 on the information bearing plane of the master medium 3, which are in close contact with the slave medium 2. As to details of such a magnetic transfer method, refer to Japanese Unexamined Patent Publication No. 11(1999)-117800.

Note that even when the uneven pattern formed on the substrate 31 of the master medium 3 is an uneven negative pattern reverse to the positive pattern of FIG. 2, the same information as the above can be magnetically transferred and recorded by making a direction of the initial magnetic field Hin and a direction of the transferring magnetic field Hdu reverse to the above directions.

When the substrate 31 is a ferromagnetic substance such as Ni, the magnetic transfer can be performed only by the substrate 31, and it is unnecessary to cover the substrate 31 with the foregoing magnetic layer 32 (soft magnetic layer). A good magnetic transfer can be achieved by providing a magnetic layer 32 having an excellent transfer property. When the substrate 31 is made of a nonmagnetic substance, it is necessary to provide the magnetic layer 32 on the substrate 31.

When the substrate 31 made of a ferromagnetic metal is covered with the magnetic layer 32, a nonmagnetic layer should be provided between the substrate 31 and the magnetic layer 32 in order to shield from the influence of the magnetism of the substrate 31. Furthermore, when a protection film such as diamond-like carbon (DLC) is provided on the uppermost layer, this protection film enhances a resistance to contact, and the magnetic transfer can be performed many times. A Si film may be formed under the DLC protection film by sputtering and the like.

Furthermore, when the magnetic transfer is performed for both surfaces of the slave medium 2, the magnetic transfer is performed for one surface of the slave medium 2 and then for the other surface thereof in different steps.

Next, description will be made for the preparation of the master medium 3. As the substrate 31 of the master medium 3, nickel, silicon, a quartz plate, glass, aluminum, an alloy, ceramics, synthetic resin and the like are used. The formation of the uneven pattern is performed by a stamper method, a photo-fabrication method and the like.

The stamper method is performed in the following manner. Photoresist is formed on a glass plate or a quartz plate having a flat surface by a spin coat method or the like. The glass plate is rotated, and at the same time, a laser beam or an electron beam, which is modulated in accordance with a servo signal, is radiated onto the photoresist. A predetermined pattern is formed by exposure on the entire surface of the photoresist. For example, the pattern extending linearly from the center of rotation to the radius direction in each track and corresponding to a servo signal is formed by exposure in the portion corresponding to each frame on the circumference of the glass plate. Thereafter, the photoresist is subjected to developing processing, and the exposed portions are removed. Thus, an original disc having an uneven pattern with the photoresist is obtained. Subsequently, plating is performed for the surface of the original disc in accordance with the uneven pattern formed on the surface of the original disc, and a Ni substrate having an uneven positive pattern is prepared. Then, the Ni substrate is released from the original disc. This substrate is used as the master medium as it is, or used as the master medium after a nonmagnetic layer, a soft magnetic layer or a protection film is coated on the uneven pattern if necessary.

Alternatively, a substrate having an uneven negative pattern may be prepared in such a manner that a second original disc is prepared by performing plating for the foregoing original disc, and plating is performed by use of the second original disc. Furthermore, a substrate having an uneven positive pattern may be prepared in such a manner that a third original disc is prepared by performing plating for the second original disc or by pressing resin liquid against the second original disc to harden the second original disc, and plating is performed for the third original disc.

On the other hand, a substrate may be formed in the following manner. A pattern by photoresist is formed on the foregoing glass plate, then holes are formed in the glass plate by etching to obtain an original disc with the photoresist removed therefrom, and subsequently, the same preparation steps as above are performed.

As a material of the substrate made of a metal, Ni or a Ni alloy can be used. Various metal film growth methods including electroless plating, electroforming, sputtering and ion plating can be applied for the plating for preparing the substrate. A depth of the uneven pattern on the substrate, that is, a height of the protrusions, is preferably set within a range of 80 to 800 nm, more preferably within a range of 150 to 600 nm. When the information signal of the master medium is a servo signal, the uneven pattern is formed so that the length is in the radius direction. For example, the uneven pattern should have a length of 0.3 to 20 μm in the radius direction of the substrate and a length of 0.2 to 5 μm in the circumference direction thereof. For a pattern bearing an information signal that is a servo signal, it is preferable to select a pattern longer in the radius direction than in the circumference direction within these ranges.

The formation of the foregoing magnetic layer (soft magnetic layer) is performed in such a manner that a magnetic material is grown by a plating method or a vacuum film growth method, which includes a vacuum evaporation method, a sputtering method, an ion plating method and the like. As a magnetic material for the magnetic layer, Co, a Co alloy (CoNi, CoNiZr, CoNbTaZr and the like), Fe, an Fe alloy (FeCo, FeCoNi, FeNiMo, FeAlSi, FeAl and FeTaN), Ni and an Ni alloy (NiFe) can be used. FeCo and FeCoNi are particularly preferable as the magnetic material for the magnetic layer. A thickness of the magnetic layer is preferably set within a range of 50 to 500 nm, more preferably within a range of 150 to 400 nm. As a material of the nonmagnetic layer provided as a base layer under the magnetic layer, Cr, CrTi, CoCr, CrTa, CrMo, NiAl, Ru, C, Ti, Al, Mo, W, Ta, Nb and the like are used. The nonmagnetic layer can suppress deterioration in quality of the signal when the substrate is a ferromagnetic substance.

A protection film such as the DLC should be provided on the magnetic layer, and a lubricant layer maybe provided on the magnetic layer. It is more preferable that the DLC film and the lubricant layer which have a thickness of 5 to 30 nm in total be present as the protection film on the magnetic layer. A close-contact-strengthening layer made of a material such as Si may be provided between the magnetic layer and the protection film. Lubricant reduces deterioration in durability owing to the occurrence of flaws caused by rubbing when slippage of the master medium from the slave medium in the contacting step is corrected.

A resin substrate may be prepared by use of the original disc, and a magnetic layer may be provided on a surface of the resin substrate. Thus, the resultant structure may be used as a master medium. As a resin material of the resin substrate, acrylic resin such as polycarbonate and polymethyl methacrylate, vinyl chloride resin such as polyvinyl chloride and polyvinyl chloride copolymer, epoxy resin, amorphous polyolefin, polyester and the like can be used. Polycarbonate is preferable in terms of humidity resistance, dimension stability and cost. In the case where a molded component has burrs, the burrs are removed by burnishing or polishing. The height of the pattern protrusions on the resin substrate is preferably set within a range of 50 to 1000 nm, more preferably within a range of 200 to 500 nm.

The master medium is obtained by coating a magnetic layer on the micro pattern of the surface of the resin substrate. The formation of the magnetic layer is performed in such a manner that a magnetic material is grown by a plating method or a vacuum film growth method, which includes a vacuum evaporation method, a sputtering method, an ion plating method and the like. Meanwhile, the photofabrication method is, for example, performed in such a manner that photoresist is coated on a smooth surface of a plane-shaped substrate, and a pattern in accordance with information signals is formed by exposure and developing processing using a photo mask in accordance with the pattern of servo signals. Subsequently, in an etching step, etching of the substrate is performed in accordance with the pattern, and holes having a depth equivalent to a thickness of the magnetic layer are formed. Thereafter, a magnetic material is grown up to the surface of the substrate with a thickness equivalent to the depth of the holes by a plating method or a vacuum film growth method, which includes a vacuum evaporation method, a sputtering method, an ion plating method and the like. Next, the photoresist is removed by a lift-off method, and the surface of the substrate is polished. Thus, burrs are removed if they exist, and the surface of the substrate is smoothed.

Next, a description will be given for the slave medium 2. As the slave medium 2, a coating type magnetic recording medium or a metal thin film magnetic recording medium is used. As the coating type magnetic recording medium, a medium on the market such as a high density flexible disc is mentioned. As to the metal thin film magnetic recording medium, Co, a Co alloy (CoPtCr, CoCr, CoPtCrTa, CoPtCrNbTa, CocrB, CoNi and the like), Fe, an Fe alloy (FeCo, FePt and FeCoNi) can be used as a magnetic material. Since these materials have high magnetic flux densities and magnetic anisotropy in a direction identical to a direction of the magnetic field application (the direction of the magnetic field application is parallel to the surfaces of the master medium and the slave medium in the case of intra-recording, and the direction of the magnetic field application is perpendicular to the surfaces of the master medium and the slave medium in the case of vertical recording), these materials are preferable because a clear transfer can be performed by using them. To allow a portion (supporting body side) under the magnetic material to have necessary magnetic anisotropy, a nonmagnetic base layer should be provided. This nonmagnetic base layer needs to be matched with the magnetic layer terms of crystal structure and lattice constant. To allow the nonmagnetic base layer to have the same crystal structure and the same lattice constant as those of the magnetic layer, Cr, CrTi, CoCr, CrTa, CrMo, NiAl, Ru or the like is used.

Herein below, examples 1 to 8 and comparative examples 1 and 2 of the magnetic transfer method of the present invention are shown, and evaluation results of the properties thereof are shown in Table 1.

EXAMPLE 1 TO 8

In the magnetic transfer method of each of the examples 1 to 8, as a slave medium, a high density flexible disc (Zip 250) on the market, which is made of a coating type medium, was used, and initial magnetization (DC demagnetization) was performed therefor by use of an electromagnet apparatus so that a peak magnetic field strength could be 398 kA/m (5000 Oe: twice as much as Hc of the slave medium). The slave medium was pressed to bring it into close contact with the master medium by use of the rubber-made elastic member made of rubber having a Young's modulus and a thickness which are varied for each example as shown in Table 1. Then, in this state, a transferring magnetic field of 199 kA/m (2500 Oe) was applied to the slave medium and the master medium by use of the electromagnet apparatus in a direction reverse to that of the initial magnetic field. Thus, the magnetic transfer was performed. In addition, the applied pressure was varied for each example as shown in Table 1.

The master medium was prepared by a stamper method. On a Ni substrate having an uneven pattern, a magnetic layer with 30 at % of FeCo was provided to have a thickness of 200 nm at 25° C. The pattern formed on the magnetic layer has the following shape. Specifically, lines, each having a width of 5μm, are extended radially within a range of 20 to 40 mm from the center of the disc at an equal interval. The interval of the lines at the innermost position, which is 20 mm distant radially from the center of the disc, is 1.2μm. Note that the magnetic layer was prepared by a DC sputtering method. Here, the preparing temperature was set at 25° C., Ar sputtering pressure was set at $1.5\times10^{-4}$ Pa(1.08 mTorr), and applied power was set at 2.80 W/cm².

Comparative Examples 1 and 2

In the magnetic transfer method of each of the comparative examples 1 and 2, the same slave medium and master medium as those of the examples 1 to 8 were used. In the comparative example 1, the elastic member has a lower Young's modulus than the examples and applied pressure and thickness equal to those of the example 1. In the comparative example 2, the elastic member has a higher Young's modulus than the examples and applied pressure and thickness equal to those of the example 4.

In Table 1, as an evaluation method for "signal missing", that is, for a close-contact property, magnetic developing solution (manufactured by Sigma Hi-Chemical Inc.; Sigmarker Q) was diluted ten times. The solution was dropped on the slave medium that had been subjected to the magnetic transfer, and dried. Then, "the signal missing" was evaluated based on variation at the edge at the developed transferred signal. The servo signal was observed by ten fields of view randomly under a differential interference microscope at magnification of 50 for the signal missing existing on the slave medium. From the diameter d of the adhering substance and the diameter D of the signal missing portion, which exist on each signal missing portion, an expansion ratio Drel ($=100\times(D-d)/d$) of the signal missing portion was calculated. If an average Drel obtained is a good value, which is less than 10%, the evaluation result is shown by the symbol "○". If the Drel is within a passable value range of 10 to 20%, the evaluation result is shown by the symbol "Δ". If the Drel is not a passable value, which exceeds 20%, the evaluation result is shown by the symbol "X".

Moreover, as evaluation of a "surface property of the slave medium", surface roughness Ra (Ra1) of the surface of the slave medium not having been subjected to the magnetic transfer is measured. Under the conditions of each of the examples and comparative examples, close contact and releasing are iterated 1000 times for the same master medium and slave medium. Surface roughness Ra (Ra2) of the surface of the slave medium having been subjected to the close contact and the release is measured. From the above, an increasing ratio Rin ($=100\times(Ra2-Ra1)/Ra1$) is calculated. If Rin is a good value, which is 2% or less, the evaluation result is shown by the symbol "○". If the Rin is within a passable value range of 3 to 5%, the evaluation result is shown by the symbol "Δ". If the Rin is not a passable value, which is 6% or more, the evaluation result is shown by the symbol "X".

Furthermore, evaluation of "durability of the master medium" is performed in the following manner. Under the conditions of each of the examples and comparative examples, the close contact and the release are iterated 1000 times for the same master medium and slave medium. Thereafter, the surface of the master medium is observed by fifty fields of view randomly under a differential interference microscope at magnification of 480. If the evaluation result is a good value where two or less spots of abrasion or crack of the magnetic layer were observed in the fifty fields of view, the evaluation result is shown by the symbol "○". If the evaluation result is a failure value where three or more spots of abrasion or crack of the magnetic layer were observed, the evaluation result is shown by the symbol "X".

As is understood from the results of Table 1, in each of the examples 1 to 8, where the Young's modulus, the thickness and the applied pressure of the elastic member is within a proper range, the evaluation result for the signal missing is good (○) or passable (Δ), and the quality of the signal transferred to the slave medium is good. Moreover, the evaluation result for the surface property of the slave medium is also good. As for the durability of the master medium, except for the example 6 where the applied pressure is high, each of the examples 1 to 5, 7 and 8 shows a good result. Particularly in the examples 1 to 4, good results are obtained.

On the other hand, in the comparative example 1 where the Young's modulus of the elastic member is extremely low, compared with the example 1 where the applied pressure and the thickness thereof are equal to those of the comparative example 1, the amount of signal missing is larger, leading to a bad result. Also, the surface roughness of the slave medium is slightly deteriorated. Moreover, in the comparative example 2 where the Young's modulus of the elastic member is extremely high, compared with the example 4 where the applied pressure and the thickness thereof are equal to those of the comparative example 2, the amount of the signal missing is larger, leading to a bad result. Also, the surface roughness of the slave medium is deteriorated.

TABLE 1

| Example | Young's modulus (Pa) | Applied pressure (Pa) | Thickness (mm) | Signal missing Drel (%) | Surface property Rin (%) | Durability |
|---|---|---|---|---|---|---|
| Example 1 | $6.0 \times 10^{-5}$ | $1.0 \times 10^{-4}$ | 5.7 | 3 (○) | 2 (○) | 0 (○) |
| Example 2 | $1.2 \times 10^{-0}$ | $2.3 \times 10^{-4}$ | 3.1 | 6 (○) | 1 (○) | 0 (○) |
| Example 3 | $4.8 \times 10^{+5}$ | $3.9 \times 10^{-3}$ | 2.0 | 7 (○) | 2 (○) | 0 (○) |
| Example 4 | $2.9 \times 10^{+10}$ | $4.6 \times 10^{-3}$ | 0.5 | 9 (○) | 2 (○) | 1 (○) |
| Example 5 | $4.8 \times 10^{+5}$ | $6.2 \times 10^{-4}$ | 2.0 | 13 (Δ) | 2 (○) | 0 (○) |
| Example 6 | $4.8 \times 10^{+5}$ | $5.1 \times 10^{-3}$ | 2.0 | 6 (○) | 4 (Δ) | 4 (X) |
| Example 7 | $4.8 \times 10^{+5}$ | $3.9 \times 10^{-3}$ | 0.05 | 17 (Δ) | 3 (Δ) | 2 (○) |
| Example 8 | $4.8 \times 10^{+5}$ | $3.9 \times 10^{-3}$ | 8.0 | 6 (○) | 4 (Δ) | 1 (○) |
| Comparative example 1 | $4.3 \times 10^{-5}$ | $1.0 \times 10^{-4}$ | 5.7 | 21 (X) | 3 (Δ) | 0 (○) |
| Comparative Example 2 | $4.3 \times 10^{+10}$ | $4.6 \times 10^{-3}$ | 0.5 | 23 (X) | 7 (X) | 0 (○) |

What is claimed is:

1. A magnetic transfer method, comprising the steps of:
preparing a master medium bearing information signals;
preparing a slave medium;
allowing said master medium and said slave medium to be brought into close contact with each other; and
applying magnetic field to said master medium and said slave medium, thus magnetically transferring the information signals of said master medium said slave medium,
wherein a material having an elastic property is mounted on one surface of said slave medium opposite to the other surface thereof contacting said master medium, and a pressing support member is mounted on said material, said elastic property being such as to deform in accordance with a surface shape of said slave medium when a contact pressure is applied to said material and to restore to an original surface shape thereof when said slave medium is released from said master medium,
wherein a surface of the material contacting the slave medium has a convex shape;
wherein the surface of the material contacting the slave medium has the convex shape prior to contact pressure being applied to the material.

* * * * *